United States Patent
Chan et al.

(10) Patent No.: US 7,352,700 B2
(45) Date of Patent: Apr. 1, 2008

(54) METHODS AND DEVICES FOR MAXIMIZING THE THROUGHPUT OF TCP/IP DATA ALONG WIRELESS LINKS

(75) Inventors: Mun Choon Chan, Edison, NJ (US); Ramachandran Ramjee, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 826 days.

(21) Appl. No.: 10/657,242

(22) Filed: Sep. 9, 2003

(65) Prior Publication Data

US 2005/0053002 A1    Mar. 10, 2005

(51) Int. Cl.
*H04J 1/16* (2006.01)
(52) U.S. Cl. ...................... 370/235; 370/252
(58) Field of Classification Search ............... 370/229, 370/230, 231, 232, 235, 238, 248, 252, 395.52, 370/253, 401, 402
See application file for complete search history.

(56) References Cited

U.S. PATENT DOCUMENTS

| | | | | |
|---|---|---|---|---|
| 5,442,637 | A * | 8/1995 | Nguyen ..................... | 714/708 |
| 6,215,769 | B1 * | 4/2001 | Ghani et al. ................ | 370/230 |
| 6,252,851 | B1 * | 6/2001 | Siu et al. .................... | 370/236 |
| 6,438,101 | B1 * | 8/2002 | Kalampoukas et al. ..... | 370/229 |
| 6,646,987 | B1 * | 11/2003 | Qaddoura ................... | 370/231 |
| 6,687,227 | B1 * | 2/2004 | Li et al. ...................... | 370/231 |
| 7,283,474 | B1 * | 10/2007 | Bergenwall ................. | 370/235 |
| 2005/0088972 | A1 * | 4/2005 | Zhang et al. ............... | 370/235 |

OTHER PUBLICATIONS

A. Bakre et al., *Handoff and System Support For Indirect TCP/IP*, in Proc. of Second Usenix Symposium on Mobile and Location-Independent Computing, Apr. 1995.
H. Balakrishnan et al., *Improving TCP/IP Performance Over Wireless Networks*, in Proc. of ACM Mobicom, Nov. 1995.
N. Bansal et al., *Analysis of SRPT Scheduling: Investigating Unfairness*, in Proc. of ACM Sigmetrics, 2001.
P. Bender et al., *A Bandwidth Efficient High Speed Wireless Data Service For Nomadic Users*, IEEE Communications Magazine, Jul. 2000.
P. Bhagwat et al., *Enhancing Throughput Over Wireless LANs Using Channel State Dependent Packet Scheduling*, in Proc. IEEE INFOCOM'96, pp. 1133-1140, Mar. 1996.
K. Brown et al., *M-TCP: TCP For Mobile Cellular Networks*, ACM Computer Communications Review vol. 27, No. 5, 1997.
TIE/EIA/cdma2000, *Mobile Station—Base Station Compatibility Standard For Dual-Mode Wideband Spread Spectrum Cellular Systems*, Washington: Telecommunication Industry Association, 1999.
M-C Chan et al., *TCP/IP Performance Over 3G Wireless Links With Rate and Delay Variation*, in Proc. of ACM Mobicom'02, 2002.

(Continued)

*Primary Examiner*—Brenda Pham

(57) ABSTRACT

The amount of TCP/IP packets which can be sent from an Internet network to a wireless network is maximized by modifying a receive window value of an acknowledgment (ACK) before the ACK is sent on to a source of data packets within the Internet network. The receive window value is modified to take into consideration delay and rate variations which occur in the wireless network.

10 Claims, 3 Drawing Sheets

OTHER PUBLICATIONS

X. Chen et al., *Preferential Treatment For Short Flows to Reduce Web Latency*, USC/ISI Technical Report ISI-TR-548, Oct. 2001.

T. Go et al., *Freeze-TCP: A True End-To-End Enhancement Mechanism For Mobile Environments*, in Proc. IEEE INFOCOM, 2000.

L. Guo et al., *The War Between Mice and Elephants*, in Proc. of ICNP'01, 2001.

H. Inamura et al., *TCP Over 2.5G and 3G Wireless Networks*, draft-ietf-pilc-2.5g3g-07, Aug. 2002.

L. Kalampoukas et al., *Explicit Window Adaptation: A Method to Enhance TCP Performance*, IEEE/ACM Transactions on Networking, Jun. 2002.

F. Khafizov et al., *TCP Over CDMA200 Networks*, Internet Draft, draft-khafizov-pilc-cdma2000-00.txt, Nov. 2001.

R. Ludwig et al., *Multi-Layer Tracing of TCP Over a Reliable Wireless Link*, in Proc. of ACM SIGMETRICS, 1999.

R. Ludwig et al., *The Eifel Algorithm: Making TCP Robust Against Spurious Retransmissions*, ACM Computer Communications Review, vol. 30, No. 1, Jan. 2000.

Third Generation Partnership Project, *RLC Protocol Specification* (3G TS 25.322), 1999.

TIA/EIA/IS-707-A-2.10, *Data Service Options For Spread Spectrum Systems: Radio Link Protocol Type 3*, Jan. 2000.

S. Karandikar et al., *TCP Rate Control*, ACM Computer Communication Review, Jan. 2000.

N. T. Spring et al., *Receiver Based Management of Low Bandwidth Access Links*, in Proc. of IEEE INFOCOM, 2000.

N. H. Vaidya et al., *Delayed Duplicate Acknowledgements: A TCP-Unaware Approach to Improve Performance of TCP Over Wireless*, Technical Report 99-003, Computer Science Dept., Texas A&M University, Feb. 1999.

*Queueing Systems*, vol. II, Wiley-Interscience, 1975.

N. S. Joshi et al., *Downlink Scheduling in CDMA Data Networks*, in Proc. of Mobicom, 2000.

Z. Shao et al., *Scheduling Heavy-Tailed Data Traffic Over the Wireless Internet*, in Proc. of VTC, 2002.

\* cited by examiner

FIG. 1
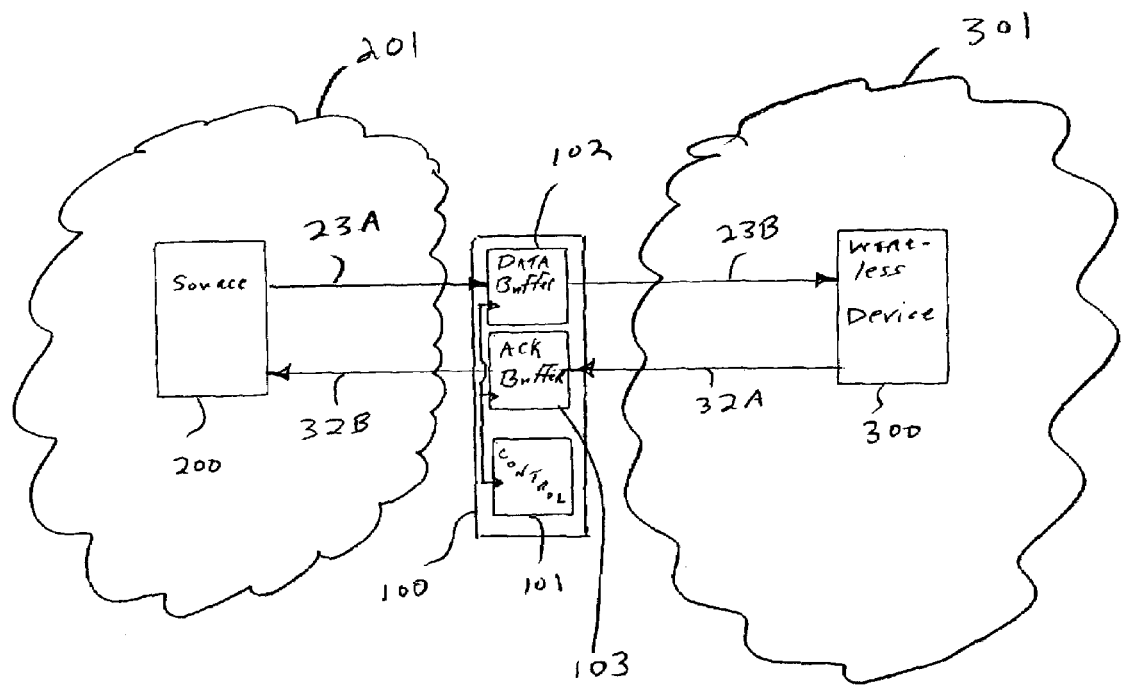
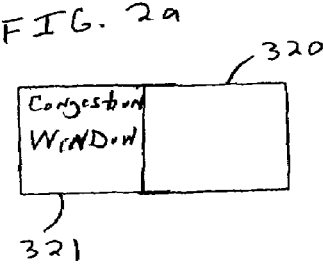
FIG. 2a
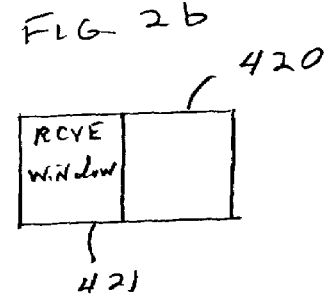
FIG. 2b

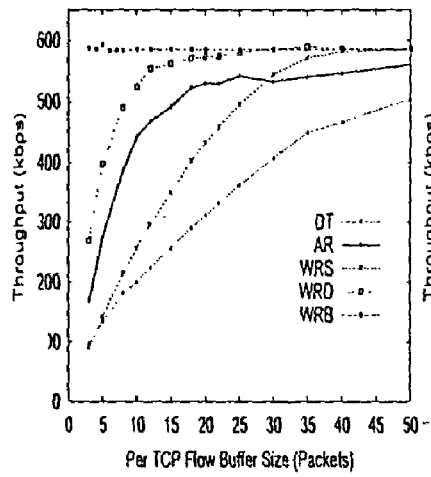
(a) TCP Reno
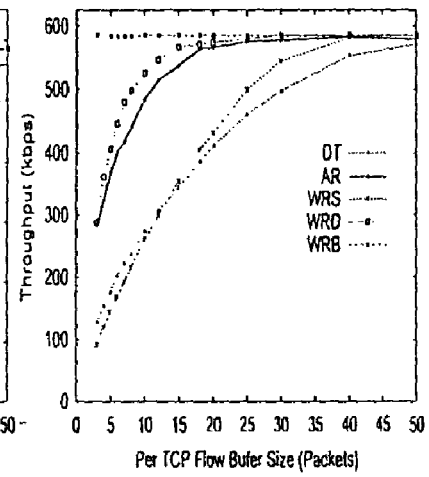
(b) TCP Sack
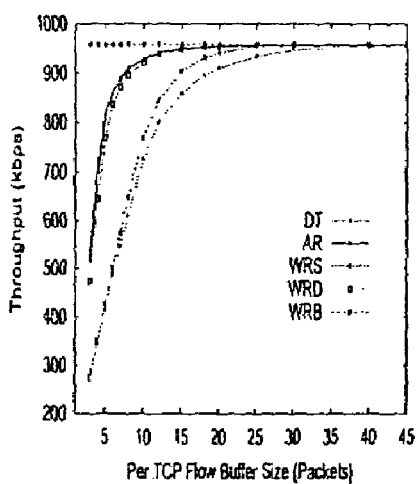
(a) 4 Users
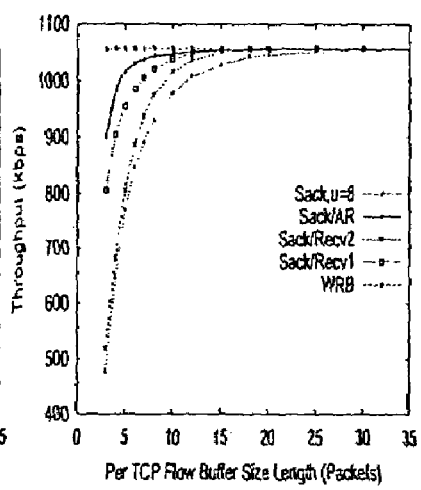
(b) 8 Users FIG. 5
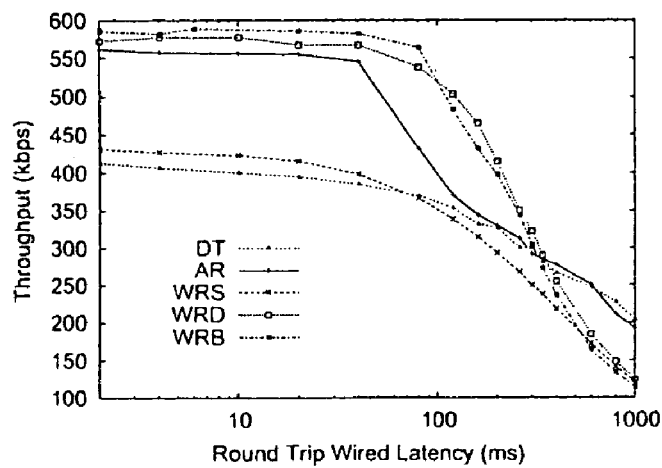
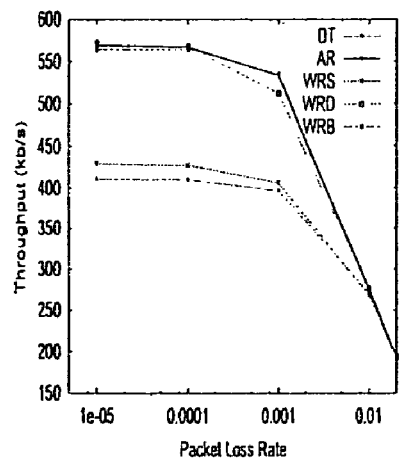 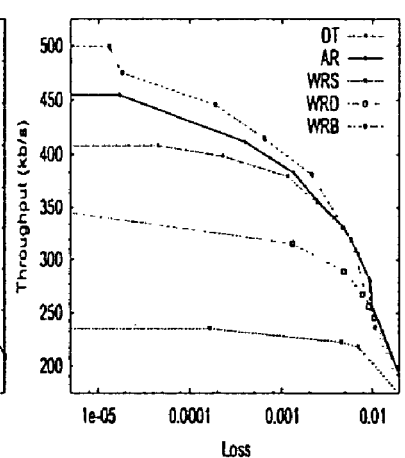
FIG 6a     FIG. 6b
(a) Random Loss     (b) Congestion Loss

METHODS AND DEVICES FOR MAXIMIZING THE THROUGHPUT OF TCP/IP DATA ALONG WIRELESS LINKS

It is no secret that more and more people wish to receive email and other Internet-based messages on their wireless devices (e.g., cell phones, PDAs). Historically, however, the Internet (known as a so-called wired network, e.g., a network where signals are sent via a physical copper wire instead of over-the-air) and wireless networks developed separately from one another. As a result, the most common way of sending and receiving data over the Internet, called Transmission Control Protocol/Internet Protocol (TCP/IP), is not the most common way that data is sent over a wireless network. One of the challenges in connecting a wired network to a wireless network is related to the different speeds at which these networks operate and their relative reliabilities. Wired networks are more reliable than wireless networks and typically send data at rates which are much higher than the rates used by wireless networks. When high speed data is sent from a wired network in a reliable manner to a much slower speed, sometimes unreliable wireless network, some kind of "traffic cop" is needed in between to ensure proper communications.

One such device is called a radio network controller (RNC). Typically, an RNC contains a buffer (e.g., memory) for storing incoming TCP/IP data from an Internet-based network. Subsequently, this data must be re-transmitted by the RNC to a wireless device over a slower speed, less reliable wireless network. Because the RNC may receive a large amount of data over a very short period of time, it may be unable to transmit all of its stored data to a wireless device before becoming congested (i.e., before the buffer overflows). Once the buffer overflows, packets of data in the buffer are dropped; an undesirable outcome.

Sometimes the wireless link between the RNC and mobile device is lost. This also results in a loss of packets. Realizing this, most existing RNCs retain a copy of each packet until the wireless device sends an acknowledgement (ACK) that it has received the packet successfully. ACKs are also used to regulate the amount of packets sent from a source of TCP/IP packets within an Internet network to an RNC for eventual delivery to a wireless device. If the source does not receive an ACK, no new packets will be sent.

The re-transmission and loss of packets introduces delay and rate variations. Large delay and rate variations are common in a wireless network. In contrast, such variations are relatively small within Internet-based networks as well as other wired networks. In fact, in order to format data packets according to TCP/IP, most TCP/IP communication equipment assumes that there will be little fluctuation in both the delay and rate at which packets are transmitted and received. These assumptions, however, do not apply when TCP/IP packets originating at an Internet-based network need to eventually be sent over a wireless network.

To allow TCP/IP based data to be transmitted between an Internet-based network and a wireless device, there must be some way of adjusting the flow of TCP/IP packets when delay and rate variations fluctuate in order to maximize the amount of information (i.e., throughput) sent between an Internet-based network and a wireless device.

BRIEF DESCRIPTION OF THE DRAWINGS

FIG. 1 depicts a simplified block diagram of an Internet-based network connected to a wireless-based network.

FIG. 2a depicts a simplified illustration of a congestion window used by a source of TCP/IP data.

FIG. 2b depicts a simplified illustration of a receive window included in the header of an acknowledgement packet according to one embodiment of the present invention.

FIGS. 3a, 3b, 4a, 4b, 5, and 6a, 6b graphically depict throughput versus queue length, latency and loss, respectively.

SUMMARY OF THE INVENTION

The flow of TCP/IP packets to a wireless network or device is maximized in accordance with the present invention by a modifying a receive window value of an ACK before transmitting the ACK on to a source of packets within an Internet or wired network. The receive window is modified to take into consideration delay and rate variations which occur in the wireless network.

DETAILED DESCRIPTION OF THE INVENTION

Referring now to FIG. 1, there is shown a simplified view of an Internet-based network 201 operable to send TCP/IP formatted data packets ("TCP/IP data" for short) from a source 200 to a wireless device 300 within wireless network 301 via an RNC 100. It should be understood that the source 200 is the source of TCP/IP data which is ultimately sent to wireless device 300. The RNC 100 and wireless device 300 may belong to a number of different types of wireless networks, for example, a third generation (3G) wireless network. Though not shown in FIG. 1, it should be understood that other devices are typically used in between RNC 100 and wireless device 300, for example, one or more base stations. For ease of explanation, these base stations have been omitted from FIG. 1. At some point in time a TCP/IP data message is sent from the source 200 via pathway 23A to RNC 100. The message is stored in data buffer 102 before being transmitted to wireless device 300 via pathway 23B. Upon receipt of each packet within the message, wireless device 300 is operable to send an ACK along pathway 32A back to RNC 100. ACKs received by RNC 100 are stored in ACK buffer 103. This ACK is sent by the RNC 100 back to the source 200 via pathway 32B to inform the source 200 that a corresponding packet has been received. Upon receiving an ACK, the source 200 is typically prompted to transmit an additional packet on to RNC 100 provided such a transmission does not violate limits set by a congestion window contained within source 200. FIG. 2a shows a simplified illustration of a congestion window 321 within memory unit 320 which is part of source 200. More specifically, congestion window 321 comprises a data rate value (e.g. 32 kilobytes) which acts as an upper limit on the amount of packets which can be sent to RNC 100.

The congestion window value, however, is just an estimate. To realize maximum throughput, the estimate needs to be adjusted based on the near, real-time conditions of wireless network 301 and buffer 102.

In accordance with one embodiment of the present invention, RNC 100 is operable to modify an ACK received from the wireless device 300 before forwarding it on to the source 200. The modified ACK contains a value (e.g., 64 kilobytes) based on the present condition of wireless network 301 which will help the source 200 select the amount of data which can be sent to the wireless device 300 to maximize throughput without overflowing or underflowing buffer 102.

It should be understood that the buffer 102 shown on FIG. 1 is a per-user buffer. That is, each user or source of data within network 201 is given an amount of buffer space within RNC 100. This buffer space is referred to as buffer 102. RNC 100 is also shown comprising a control section 101. In one embodiment of the present invention, the control section 101 is operable to estimate delay and rate variations of wireless links 23B and 32A in real-time, and modify an ACK before it is forwarded on to the source 200. As is known by those skilled in the art, delay and rate variations may be derived, for example, by detecting the number of packets within link 23B and the number of ACKs within link 32A. Though shown as separate units, it should be understood that the control section 101 and buffers 102,103 may comprise a single unit or may be further broken down into additional units. Further, it should be understood that the control section 101 and/or buffers 102,103 may be realized in whole or in part in hardware, firmware, software or some combination of the three.

FIG. 2b depicts a highly simplified illustration of an ACK 420 comprising a receive window value 421. In one embodiment of the invention, the control section 101 is operable to modify the receive window value 421 of the ACK 420 based on the estimated delay and rate variations. For example, the receive window value may be a data rate equal to 32 kilobytes. After modification this rate may change to, for example, a value between 1 kilobyte and 64 kilobytes. After the receive window value 421 is modified, it is sent on to the source 200 embedded within modified ACK 420. Upon receiving the modified receive window value, source 200 is operable to compare the value to a congestion window value. Thereafter, source 200 is operable to select the lesser of the two in order to ensure that an overflow condition does not occur. The lesser value is used as the transmission rate at which packets are sent to the buffer 102.

As was mentioned above, the aim of the present invention is to maximize throughput. To do so, at least one packet must always be available to be transmitted from buffer 102 to prevent underflow and there must be no packets lost due to overflow. Both of these requirements are satisfied by the use of a modified ACK.

Having provided a general overview of the invention, a more detailed discussion will now be provided.

Consider now the arrival of an iTH packet at buffer 102 sent by source 200 (e.g., a web server). Let $Y_i$ represent the number of packets within the wireless link 23B when packet i arrives, where $Y_i$ is a function of the varying rates and delays in the forward and reverse directions of the wireless links 23B, 32A, and let $N_i$ ($\leq B$) be the number of packets in buffer 102 when packet i arrives, where B is the size of buffer 102. Assuming that delays associated with wired network 201 are insignificant as compared with wireless network 301, all packets from source 200 are stored in buffer 102 and all ACKs are immediately sent to source 200 leaving no outstanding packets in the wired network 201 which need to be sent to wireless device 300. Under these conditions, the sum of data packets in the buffer 102 and in the wireless link equals a receive window size, W, or $$W = N_i + Y_i + 1. \quad (1)$$

To avoid buffer underflows, the window size (i.e., data rate value), W, must obey:

$$\forall i Y_i + 1 < W \text{ (no underflow)}. \quad (2)$$

Equation (2) states that the receive window size must be greater than the instantaneous number of packets in the wireless link, $Y_i$, and there must be at least one packet in buffer 102 for there to be no underflow. However, because we also assume that Equation (1) is true, $N_i \leq 1$ when there is no underflow and thus Equation (2) is also a sufficient condition for no underflow.

For there to be no overflow (dropped packets) from Equation (1), B must be $\geq W_i - Y_i$. In other words, $$\forall i Y_i + B \geq W_i \text{ (no overflow)}. \quad (3)$$

In the discussion above, it was assumed that every packet was acknowledged with a separate ACK. However, RNC 100 is further operable to vary the value of the receive window size accordingly when acknowledgements represent more than one packet.

As described previously above, RNC 100 is operable to generate a receive window size value. Because this value changes when the delay and rate variations of network 301 changes (represented by links 23B, 32A) in near real time, this value can be referred to as a variable, dynamic receive window value ("WRD" for short).

Equation (4) below summarizes the steps involved in generating this value, where Y is a current estimate of the number of packets within wireless links 23B, 32A, without violating Equations (2) and (3):

$$\text{On Deque of each Data packet} \quad (4)$$
$$Y = Y + 1$$
$$\text{On Enque of each Acknowledgement}$$
$$Y = Y + 1$$
$$\text{Set } W^r = Y + B$$
$$\text{Transmit the Acknowledgement to the source.}$$

This technique is conservative as it satisfies Equation (3) (no overflow) but uses a larger receive window size value as compared with existing techniques. Because the present invention involves modifying the value of the receive window, the throughput (W/RTT) provided by the present invention is as good or better than the throughput of existing techniques because:

$$\text{If } \frac{W}{RTT} \leq R, \text{ then } \frac{W}{RTT} \leq \frac{W+k}{RTT + k/R} \forall k \geq 0$$

where W is the window size, RTT is the round trip time and R is the average rate of the connection.

If the window size of an existing technique (e.g., Window Regulator-Static, "WRS") is B, the size of the present window is given by B+Y, where Y is always a positive number.

Though the WRD technique substantially prevents overflow, it may not prevent underflow. For example, suppose sometime after the comparison discussed above occurs and a transmission rate is set, but before a next modified ACK is received by source 200, the condition of wireless network 301 changes. If the change makes it possible to send more packets to device 300 yet the transmission rate is set too small, the buffer 102 will underflow because all packets sent from source 200 to RNC 100 will be re-transmitted to device 300 immediately, thus leaving buffer 102 empty, before a next ACK is received by source 200. Without the reception of a modified ACK by source 200, no new packets will be sent from source 200 to RNC 100 to fill up buffer 102.

In a further embodiment of the invention, RNC 100 is operable to store ACKs and forward them to source 200 only when needed to prevent the underflow of buffer 102. For example, at any given point in time the delay or rate variations within wireless network 301 may remain fairly constant. If this occurs, it is arguably unnecessary for RNC 100 to continue to modify an ACK in the same manner and forward it on to source 200. Instead, RNC 100 may be operable to store one or more ACKs until such time as control unit 101 detects buffer 102 is approaching a substantially empty state and/or the delay and rate variations of wireless network 301 substantially change, at which time RNC 100 is operable to modify a receive window value of one or more ACKs and forward the modified ACKs on to source 200. In the former case a modified receive window value of an ACK is sent to prompt the source 200 to send packets to buffer 102 to prevent underflow. In the latter case a modified receive window value of an ACK is utilized to adjust packet throughput as discussed in detail before and above.

This additional embodiment can be referred to as a Window Regulator Buffer or "WRB".

Equation (5) summarizes the operation of RNC 100 operating using WRB:

On Deque of each Data packet  (5)

$Y = Y + 1$

If there is an Acknowledgement stored in the Acknowledgement buffer, then $W = Y + B + B_a$ Transmit Acknowledgement to the source
endif On Enque of each Acknowledgement, set $Y = Y + 1$ $W = Y + B + B_a$ If (new Acknowledgement AND ($W$ < previous value of $W$))

Store Acknowledgement in the Acknowledgement Buffer $B_a = B_a + 1$ else transmit Acknowledgement to the source
endif.

where $B_a$ is the size of the acknowledgement buffer.

Note that in WRB, $B_a$ can only be increased until it converges to some value $Y_{max}$ and $\forall i W_{i+1} \geq W_i$. Note also that Equation (2) is satisfied because $\forall\ i\ Y_{max} \geq Y_i$ and Equation (3) is also satisfied because the delay from wired network 201 is insignificant.

The queue utilization, $Q_{WRB}$, is given by:

$$Q_{WRB} = \frac{1}{k}\sum_{i=1}^{K} 1\{Y_i + B + B_a > Y_{i+1}\}. \quad (6)$$

If the size of the acknowledgement buffer is not limited (because acknowledgements consume very little memory and do not impact the latency of new flows), then $B_a$ will grow large enough to absorb the maximum variation on the wireless link. Therefore, $Pr(Y_i+B+B_a>Y_{i+1})$ approaches one. Thus, if the flow lasts long enough, WRB achieves the maximum utilization of 1. The queue utilization $Q_{WRB}$ is $$Q_{WRB} = \frac{1}{k}\sum_{i=1}^{K} 1 = 1. \quad (7)$$

FIGS. 3a, 3b through 6a, 6b graphically summarize the results of throughput v. queue length (single user), throughput v. queue length (multiple users), throughput v. round trip wired latency and throughput v. loss, respectively of existing techniques and techniques provided by the present invention.

Summarizing the results shown in these figures, it can be said that because drop-tail (DT) and WRS cannot adapt to large rate and delay variations in a wireless channel, TCP throughput suffers.

Though an existing technique known as "acknowledgement regulator" (AR) adapts reasonably well to large variations, it does not perform well when wired latencies are significant because its associated estimation errors cause a degradation in TCP throughput.

In contrast, WRD techniques perform well in terms of throughput and robustness when faced with reasonable wired latencies. However, WRD does not perform as well as WRB when losses occur due to a congested buffer.

WRB performs the best in terms of maximum throughput, robustness in the face of relatively large wired network latencies and in the face of relatively large losses of packets due to congested buffers.

We claim:

1. A method for maximizing the throughput of Transmission Control Protocol/Internet Protocol ("TCP/IP") data comprising the steps of:
   receiving an acknowledgement (ACK) packet that includes a receive window value that has been modified, by an intermediate node, based on estimated delay and rate variations associated with at least one wireless link;
   comparing a receive window value within the modified acknowledgement packet to a congestion window value;
   selecting the lesser of the receive window value and congestion window value; and
   transmitting an amount of data toward the wireless link based on the selected value.

2. The method as in claim 1 wherein the receive window value comprises a number of packets.

3. The method as in claim 2 wherein the number of packets is substantially within the range of 1 kilobyte to 64 kilobytes.

4. The method as in claim 1 further comprising:
   determining whether a data buffer is substantially close to empty;
   determining whether the delay and rate variations have substantially changed; and
   storing one or more ACKs when said buffer is not substantially close to empty or when said variations have not substantially changed.

5. The method as in claim 4 further comprising
modifying the receive window value of an ACK packet when said buffer is substantially close to empty or when said variations have substantially changed; and
transmitting the modified ACK packet containing the modified receive window value to a source of TCP/IP data when said buffer is substantially close to empty or when said variations have substantially changed.

6. A system for maximizing the throughput of Transmission Control Protocol/Internet Protocol ("TCP/IP") data comprising a data source for:
receiving an acknowledgement (ACK) packet that includes a receive window value that has been modified, by an intermediate node, based on estimated delay and rate variations associated with at least one wireless link;
comparing a receive window value within the modified acknowledgement packet to a congestion window value;
selecting the lesser of the receive window value and congestion window value; and
transmitting an amount of data toward the wireless link based on the selected value.

7. The system as in claim 6 wherein the receive window value comprises a number of packets.

8. The system as in claim 7 wherein the number of packets is substantially within the range of 1 kilobyte to 64 kilobytes.

9. The system as in claim 6, further comprising a radio network controller for:
determining whether a data buffer is substantially close to empty;
determining whether the delay and rate variances have substantially changed; and
storing one or more ACKs when said buffer is not substantially close to empty or when said variations have not substantially changed.

10. The system as in claim 9, wherein the radio network controller further:
modifies the receive window value of an ACK packet when said buffer is substantially close to empty or when said variations have substantially changed; and
transmits the modified ACK packet containing the modified receive window value to a source of TCP/IP data when said buffer is substantially close to empty or when said variations have substantially changed.

* * * * *